United States Patent
McMahon et al.

(10) Patent No.: US 8,465,618 B2
(45) Date of Patent: Jun. 18, 2013

(54) RECOVERY OF HIGH VALUE RUBBER FROM TIRES

(75) Inventors: Edward McMahon, Chattanooga, TN (US); Uwe Zitzow, Signal Mountain, TN (US)

(73) Assignee: Rubber Recovery Solutions LLC, Chattanooga, TN (US)

( * ) Notice: Subject to any disclaimer, the term of this patent is extended or adjusted under 35 U.S.C. 154(b) by 0 days.

(21) Appl. No.: 12/288,498

(22) Filed: Oct. 21, 2008

(65) Prior Publication Data

US 2011/0023668 A1 Feb. 3, 2011

Related U.S. Application Data

(60) Provisional application No. 60/999,687, filed on Oct. 22, 2007.

(51) Int. Cl.
*B32B 38/10* (2006.01)

(52) U.S. Cl.
USPC ............ 156/267; 156/96; 156/247; 156/248; 156/250; 156/254; 156/344; 156/510; 156/584; 152/531; 152/533; 83/13; 521/40

(58) Field of Classification Search
USPC ................... 156/96, 247, 248, 250, 254, 267, 156/344, 510, 584; 152/531, 533; 83/13; 521/40
See application file for complete search history.

(56) References Cited

U.S. PATENT DOCUMENTS

| | | | | |
|---|---|---|---|---|
| 1,459,693 A | * | 6/1923 | Rand et al. | 156/344 |
| 2002/0178880 A1 | * | 12/2002 | Downing | 83/13 |
| 2008/0073020 A1 | * | 3/2008 | Lammlein | 156/110.1 |

FOREIGN PATENT DOCUMENTS

GB 2294423 A * 5/1996

* cited by examiner

*Primary Examiner* — Katarzyna Wyrozebski Lee
*Assistant Examiner* — Joshel Rivera
(74) *Attorney, Agent, or Firm* — Kent R. Moore (57) ABSTRACT

A process for recovering rubber from a tire, the tire including a rubber tread block, steel belting, and an inner liner that serves to hold the air pressure in the tire. The bead and sidewall may be removed from the tire leaving a loop of tread material. Next, the loop is placed on a rubber-separating machine to hold the loop in place. One or more cutting blades are lowered into position at the tread portion of the tire. Once the blades are in place, the tread loop is placed in motion around the rollers. As the blades contact the steel belts, the cutting blades separate the tread rubber from the reinforced rubber at the interface between the tread rubber and the steel belts.

10 Claims, 6 Drawing Sheets

RECOVERY OF HIGH VALUE RUBBER FROM TIRES

CROSS-REFERENCE TO RELATED APPLICATIONS

Provisional Application No. 60/999,687 Filed Oct. 22, 2007.

FIELD OF THE INVENTION

The field of the present invention relates generally to recovery of rubber from tires. More particularly, the present invention relates to a new method of recovering rubber from a used tire by separating or de-laminating the tread portion of the tire, which contains only rubber, from the belted portion of the tire, which contains the steel belting and other reinforcing materials. The rubber without steel or other reinforcing materials is commercially very valuable.

BACKGROUND

Tire recycling is a relatively new industry that began in 1985 to reduce the large number of tires stored in tire dumps and to reduce the number of tires going to landfill. The efforts in the 1990's were successful in both reducing the number of tires in dumps and recycling about 80% of the roughly 300 million tires that are now scrapped each year. As the production of recycled rubber has grown, so have the uses for recycled tire products. Currently, a majority of the recycled tires are used for tire derived fuel, civil engineering applications and production of ground rubber.

A tire is constructed of rubber and reinforcing materials including steel, reinforcing fiber such as polyester, and other materials. A new passenger tire weighs approximately 20 pounds and is composed, by weight, of about 70% rubber, 15% steel and 15% other material such as re-enforcing fiber.

Currently, tire recycling operations occur in three-stages: (1) collection and transportation of spent tires to a processing site, (2) shredding the tires into chips, and (3) processing the chips into various marketable products. Since a tire occupies such a large volume, its transportation cost is quite high, limiting the practical distance between a collection and a processing site to about 150 miles. Process economics dictate that plants must be sized to recycle at least two million tires per year. But such sized plants place a high demand on available tires and inevitably require that tires be shipped from ever more distant sources. Furthermore, the plants consume a large amount of energy and have high maintenance costs. As a result, these current operations tend to provide recycling companies with only a marginal return on their investment.

There are several patents that describe other methods of reclaiming the rubber from tires. Some of these involve the use of high pressure fluids such as the patents by Rutherford (U.S. Pat. No. 5,794,861) and Shinal (U.S. Pat. No. 5,683,038). In Veres (U.S. Pat. No. 5,482,215) a tread strip is fed in a flat state past a rotary cutter removing the tread rubber in a particulate form and the remaining belt is processed with ultra high pressure fluids. Bedjukh et al. (U.S. Pat. No. 6,391,930) describes a method for destroying tires with metallic cords using electric discharge.

There are other patents that refer to the use of tire pre-softening agents including a patent by Hunt, et al. (U.S. Pat. No. 5,362,759 and U.S. Pat. No. 5,611,462), Hunt and Hall (U.S. Pat. No. 5,362,759), Wortham (U.S. Pat. No. 6,872,754), Adkins (U.S. Pat. No. 5,905,095), Dobozy (U.S. Pat. No. 5,316,224), and Martinez (U.S. Pat. No. 5,304 . . . ). All of these patents, with the exception of the Martinez patent use shredded tires as the basic feedstock and reduce the size of the rubber by grinding the softened chips with the wire in place. The Martinez patent soaks primarily whole tires and then separates the tire components in a "pulverizing tank" using fluid or mechanical force. The first set of patents, while using less energy due to the pre-softened rubber, still use more energy and require more maintenance than necessary because the steel is still imbedded in the rubber during the grinding process. The Martinez patent avoids grinding the rubber with the metal embedded but introduces other problems associated with handling and soaking whole tires.

All the patents cited above use various chemicals to pre-soften the tires including d-limonene, a d-limonene/DMSO mixture, a wide range of organic solvents such as benzene, toluene, xylene, tetrahydronaphthalene and many others, as well as a 700 degrees Fahrenheit mixture of isocyanides, latex, polyurethane, soybean oil.

SUMMARY OF THE INVENTION

The present invention comprises a tread separation process which comprises several process steps. The first step in the process is to remove the sidewalls and beads from the tire either manually or through any known automatic techniques leaving the tread portion. With the sidewalls removed the tread portion becomes a continuous loop of tread material. The loop may be cut to form a continuous belt of tread material. The tread material has several layers, including a tread block comprising only rubber, and a reinforced portion below the tread block portion comprising reinforcing material and rubber. The reinforcement is typically known as steel belting. There also may be other reinforcing material such as fibers. The tire also may have an additional layer of material below the belting called an inner liner that serves to hold the air pressure in the tire. The inner liner may contain reinforcing material such as fibers. The inner liner may also be removed in the process of the present invention as it contains potentially valuable material also.

Next, the loop is placed on several rollers of a rubber-separating machine to hold the loop in place. The rollers also preferably place the loop under tension to insure the loop remains flat during processing. This can be accomplished by any number of tensioning mechanisms well know in the art. Also, one or both of the rollers can be attached to a motor so the roller can move the tread loop around the rollers (much like a treadmill).

One or more cutting blades are positioned at the tread portion of the tire. The cutting blades are lowered into position. Access to the steel belting can be accomplished by making an initial cut through tread block to expose the steel belting. Alternatively, the cutting blades can be guided to cut through the tread block until they reach the steel belting. Once the blades are in place, the tread loop is placed in motion around the rollers. As the blades contact the steel belts, the cutting blades separate the tread rubber from the reinforced rubber at the interface between the tread rubber and the steel belts. Preferably there are a sufficient number of blades to cover the width of the tread and separate the tread from the reinforced rubber in a continuous strip. There may be a single blade that has a sufficient width to span the width of the tread. The inner layer may also be removed in a similar fashion with blades positioned within the loop rather than above it. Alternately, the blades can be heated. This causes the rubber in contact with the blades to soften, thus making the cutting action easier and reducing energy and maintenance requirements.

When the rubber and metal are separated in this fashion the imprint or pattern of the metal wires are usually evident on the surface of the rubber. A preferred method of achieving this separation is using a chisel that cleanly removes the rubber from one or both sides of the two metal belts leaving a continuous belt consisting of a sandwich of wire/thin layer of rubber/wire. The chisel may be actuated by pneumatic or other means to enhance the cutting ability of the chisel. Other alternatives to the chisel include a band saw, a wire saw, or a hot wire.

With the tire having its sidewalls removed and the tread portion and inner layer separated from the reinforced portion, the components of the tire can processed further or can then be shipped to another processing location at much less cost than shipping entire tires. Separating the rubber from the steel belts in the tread area also reduces the high capital investment, energy, and maintenance cost associated with grinding the rubber with the metal present. It also produces a higher grade product since it does not contain the steel belting. Although the steel belting can be removed from the ground rubber magnetically, rubber that has been ground without steel present is more valuable than rubber that has been ground with steel that has been later magnetically removed.

An added but not necessary step is to soak the tread belt in a chemical solution that softens the rubber. This reduces the energy and maintenance requirements of the rubber separation step. It also reduces the energy and maintenance cost of any subsequent grinding of the separated rubber. However, recovering the rubber softening agent from the ground rubber may be necessary, depending on the type of chemical that is used, and specifically on the cost of the chemicals and the intended application of the rubber that is produced.

Other alternate steps include grinding only a portion of the tread, then removing the remaining rubber using the process described above. Removal of a portion of the tread reduces the force required to cut through the tread block. Moreover, the outer portions of the tread area can be removed to reduce the amount of force required by reducing the amount of tread rubber that has to be cut through outside the area containing the steel belt.

The ultimate goal of the present invention is to provide an environmentally and economically beneficial process that disposes of all the parts of the tire. Using the cutting blades or chisel(s) to separate the rubber in a tire's tread area from the embedded steel results in the following tire parts: 1) high value metal free rubber from the tread area; 2) the steel belt/thin layer of rubber/steel belt (with or without the inner liner); 3) the inner liner with polyester or similar fiber; 4) the metal free sidewall with polyester or similar fiber; and 5) the tire bead surrounded with rubber and polyester or similar fiber.

The metal free, fiber free, tread rubber can be ground into a high value crumb rubber. This product has a higher value than the rubber that has been ground with the steel and the steel later magnetically separated. The ground rubber can be recycled into various commercially valuable products.

What remains of the tread separation process described above is a belt that consists of layers of steel belt and rubber. The tire's inner line may also be included if it is not removed using the process described above. The rubber from the steel in the steel belt with or without the tire liner can be separated using high pressure water or a lower pressure water after soaking the layers in one of the solvents as described herein. The sidewalls and the inner liner, if removed, are metal free and contain polyester or similar fibers. These can also be ground and the fiber removed to yield high value crumb rubber. The sidewall can also be stamped into usable parts or products. The rubber from the steel bead can be separated from the steel using high pressure water. Water at a lower pressure can be used after soaking the layers in one of the solvents as described below. When the fibers are separated with pressurized water the fibers remain whole and are not ground into fluff. Alternatively the steel/rubber/fiber parts can be used as a source of steel and fuel in an electric arc furnace.

All of the components produced by this process can be sold without further processing or processed to more highly valued products in disposed of in an environmentally friendly way.

DETAILED DESCRIPTION OF THE INVENTION

Figure 1:
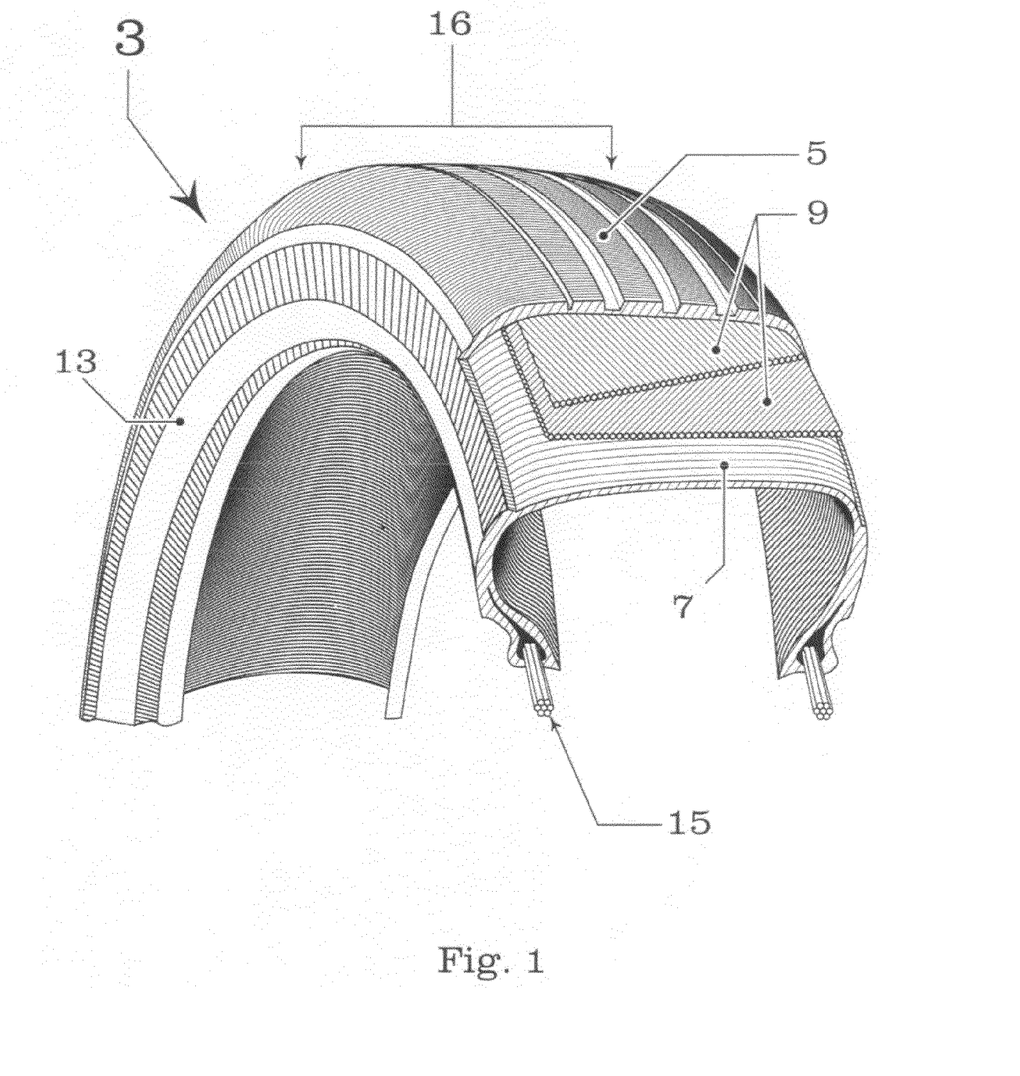
FIG. 1 is a perspective view of a typical tire.
Figure 2:
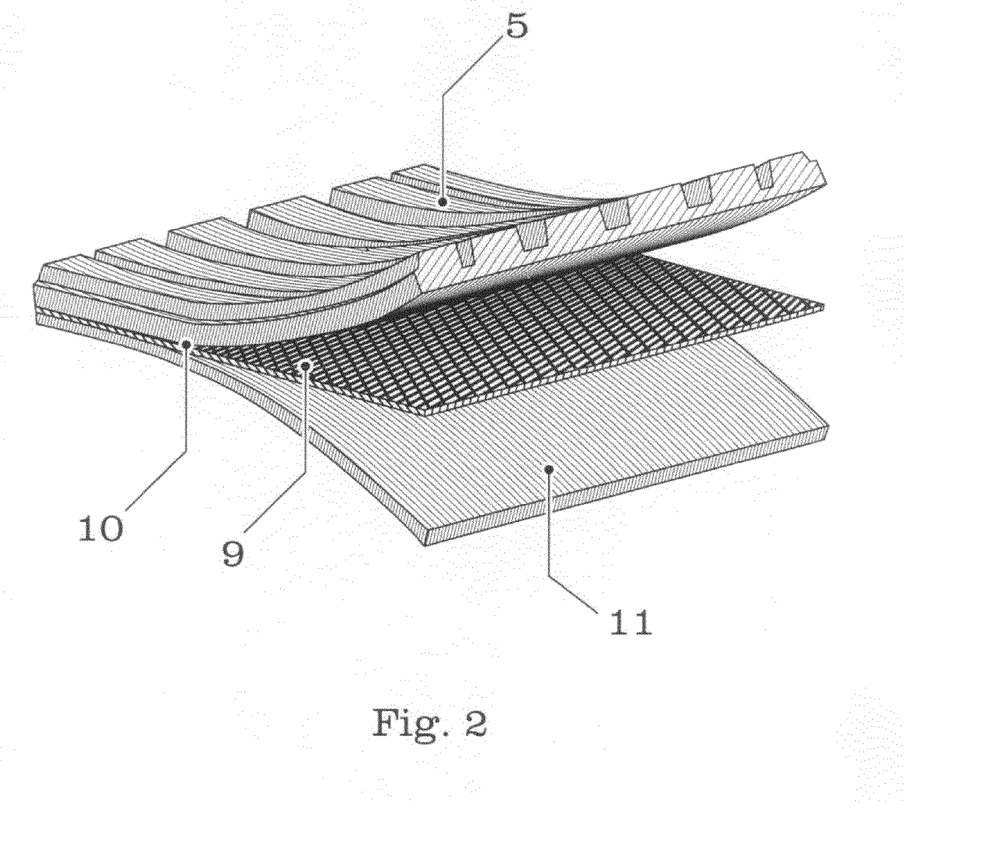
FIG. 2 is a perspective view of the tread portion, the reinforced portion and the inner portion of a tire.

Referring to FIGS. 1 and 2, a typical tire 3 includes a tread portion 5, a reinforced portion 7 below the tread portion 5 and typically having one or more layers of steel belts 9 as its reinforcement, and an inner rubber liner 11 below the reinforced portion 7. The inner rubber liner 11 may or may not have additional reinforcement including nylon or fibers 12. The tire 3 also has a sidewall 13 and a bead 15. The portions of the tire 3 having the most valuable rubber are the tread portion 5, the inner liner 11 and the sidewall 13.

The present invention of recovery of high value rubber from tires includes several process steps to separate the tread portion 5 and inner liner 11 from the reinforced portion 7 of a tire 3.

The tire 3 is processed by first removing the sidewalls 13 from the tire 3. Next, the metal beads 15 that are contained in the side walls 13 are removed. Commercially available equipment could be used to perform these functions.

As the inventors have discovered, an interface 10 between the tread portion 5 and the steel belts 9 provides a site where separation is most effective. This is due not only the nature of an interface but also to the fact that the interface 10 generally consists of a thin layer of softer rubber.

Figure 3:
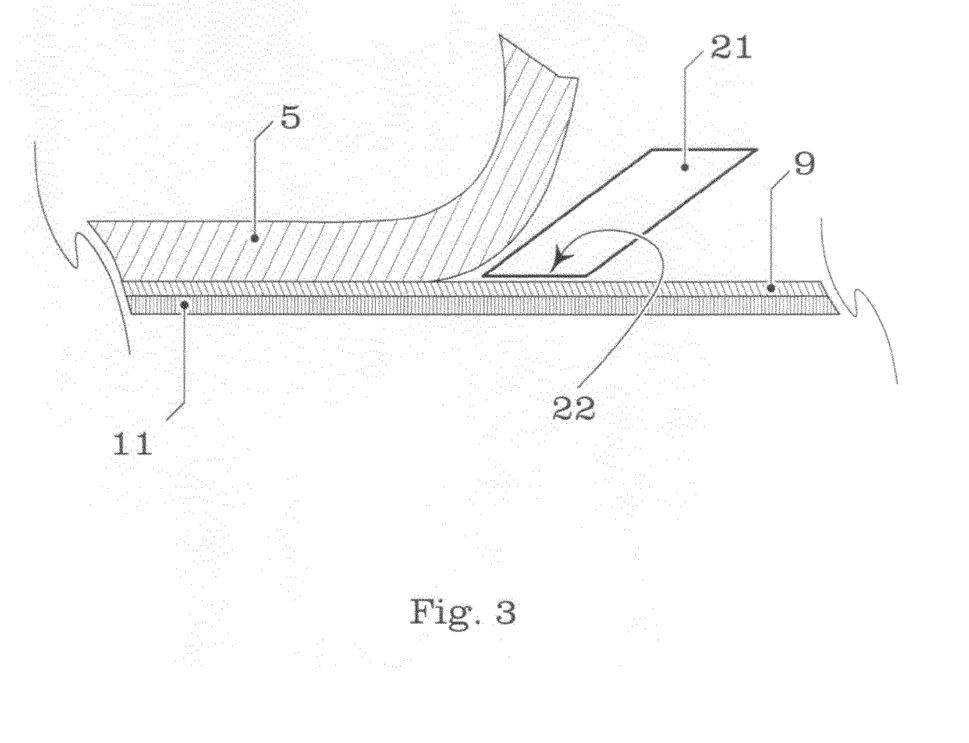
FIG. 3 is a side view showing the process detail of the chisel of the present invention.
Figure 4:
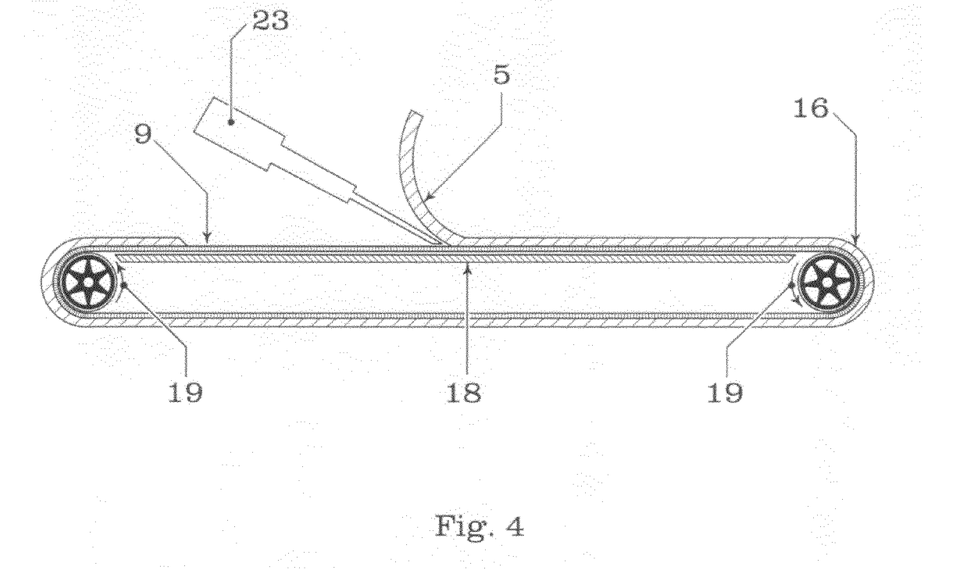
FIG. 4 is a side view showing the process detail of the rollers and chisel of the present invention.

Referring to FIGS. 3 and 4, with the sidewalls 13 removed the tire 3 becomes a continuous loop 16 of tread material to be separated into the tread portion 5, reinforced portion 7, and the inner liner 11. Next, the loop 16 is placed on a separating machine that comprises several rollers 19 which hold the loop 16 in place. The rollers 19 also preferably place the loop 3 under tension to insure the loop 3 remains relatively flat during the removal process. This can be accomplished by any number of tensioning mechanisms well know in the art. Also, one or both of the rollers 19 can be attached to a drive 20 so the rollers can move the tread loop 16 around the rollers (much like a treadmill). A flat bed 18 between the rollers 19 serves as support and cutting platform for the tread loop 16.

One or more cutting blades 21 are positioned at the tread portion 5 of the tire 3. Access to the steel belts 9 can be accomplished by making an initial cut through tread portion 5 to expose the steel belts 9. Alternatively, the cutting blades 21 can be guided to cut through the tread portion 5 until they reach the steel belts 9. Once the cutting blades 21 are in place, the tread loop 16 is placed in motion around the rollers 19. As the blades 21 contact the steel belts 9, the cutting blades 21 separate the tread portion 5 from the reinforced portion 7 at the interface 10 between the tread rubber and the metal. Preferably there are a sufficient number of blades 21 to cover the width of the tread and separate the tread portion 5 from the reinforced portion 7 in a single continuous strip. The inner liner 11 may also be removed in a similar fashion with blades 21 positioned within the loop 16 rather than above it. Alternately, the blades 21 can be heated. This causes the rubber in contact with the blades 21 to soften, thus making the cutting action easier and reducing energy and maintenance requirements.

An important feature of the present invention is the positioning of the cutting blade 21. As shown in FIG. 3, a flat portion 22 of the blade 21 is positioned so that it is relatively parallel to the interface 10. By configuring the blade 21 in this manner, the blade 21 makes a very clean cut at the interface 10.

A preferred method of achieving this separation is using a chisel 23. A chisel 23 has a flat portion 22 that is longer than most other types of blades 21. The flat portion 22 of the chisel makes the cutting action very efficient. The chisel 23 is positioned so that the beveled side 22 of the chisel 23 is parallel to the steel belt. In this way the chisel 23 rides on top of the steel belt as it moves relative to the loop 16 cuts and lifts the tread portion 5 from the steel belt. As the chisel 23 cuts through the rubber with the aid of pneumatic action, which vibrates the chisel, the chisel comes to rest on the steel. In the process, a clean metal free strip of rubber is removed from the loop 16, leaving an exposed steel belt. The rubber inner liner 11 can be removed with the same chisel action either as part of the first pass or during a subsequent step. The chisel 23 may be actuated by pneumatic means to enhance the cutting ability of the chisel 23. The hammering action of the chisel 23 can be provided by one of several mechanisms including not only pneumatic drives but also electrical drivers or mechanical devices. Other alternatives to the chisel include a band saw, a wire saw, a hot wire or other knife or cutting means.

The process of the present invention would then produce several commercially valuable products: a belt of metal-free rubber that constitutes the tire's tread portion 5, the thin layer of rubber from the tire's inner liner 11, the sidewall 13 and the steel re-enforcement belts 9 that are separated by a thin layer of rubber. The tread and sidewalls can be ground to produce crumb rubber of a size to meet the needs of the prevailing market. Alternatively, the tread and sidewalls can be cut to smaller pieces to facilitate their transport to a central grinding facility.

An additional step is to soak the tread loop 16 in a chemical solution that softens the rubber. This reduces the energy and maintenance requirements of the rubber separation step. It also reduces the energy and maintenance cost of any subsequent grinding of the separated rubber. However, recovering the rubber softening agent from the ground rubber may be necessary, depending on the type of chemical that is used, and specifically on the cost of the chemicals and the intended application of the rubber that is produced. The use of a chisel 23 is further enhanced by soaking the tread loop 16 in a rubber softening solution using a chemical agent such as di-limonene, kerosene, xylene and others. The best solvents have a solubility parameter in the range of 8-9. The softening action makes the rubber easier to cut, thus reducing both energy requirements and equipment wear. A similar benefit can be attained by the application of heat to the chisel: a warm or hot chisel softens the rubber and makes it easier to cut.

Other steps that can be added to the process of the present invention include cutting the loop 16 to create a flat belt. The rollers 19 would then guide the belt on top of the flat bed 18, keeping it flat and pushing it along and as the pneumatic chisel(s) 23 removes the rubber tread portion 5.

In addition to the use of the chisel 23 described above to separate the tread portion 5 from the steel belt, it may desirable to simultaneously grind off a small amount of the tread portion 5. A possible arrangement could include a grinding head in the cutting circuit so that a small amount of the tread portion 5 is ground off just before the remainder of the tread portion 5 is removed by the chisel 23. Care must be taken not to get too close to the steel belts 9 to ensure the rubber removed is free from steel. After a small amount of the tread portion 5 is removed by grinding, the chisel 23, described above, can cleanly remove the remaining tread portion 5. This process is superior to grinding alone since more rubber is removed without the danger of cutting into the steel. Removal of a portion of the tread reduces the force required to cut through the tread portion 5. Also, by this method, ground or flaky rubber can be produced that cannot be so easily produced with standard rubber grinders and that may have particularly desirable characteristic for certain commercial applications.

Figure 5:
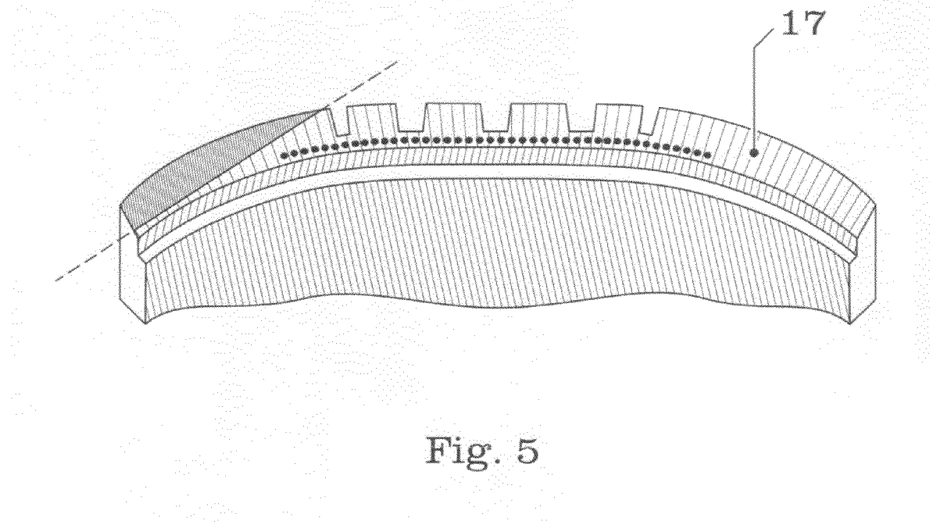
FIG. 5 is a cut away view of a tread portion of a tire showing the outer portions of the tread.

A special grinding operation may be added, not with the primary objective to remove rubber but to improve the cutting of the outer edges of the tire 3 between the end of the steel belts 9 and the outer edge 17 of the tread portion 5. As the inventors have discovered, this outer edge does not contain the steel belting 9. Therefore, there is not an interface that can be utilized to cleanly remove the tread portion 5 from the reinforced portion 7. This outer edge 17 is much more difficult to cut in a single action with the cutters 21. However, the outer edge 17 can be removed by skiving the shoulder area of the tire at a 10-15 degree angle as shown in FIG. 5. By grinding off this excess material the distance the cutters 21 have to cut between the end of the steel belts 9 and the outer edge 17 of the tire are greatly reduced thereby greatly improving the cutting effectiveness of the cutters 21 or chisels 23.

Figure 6:
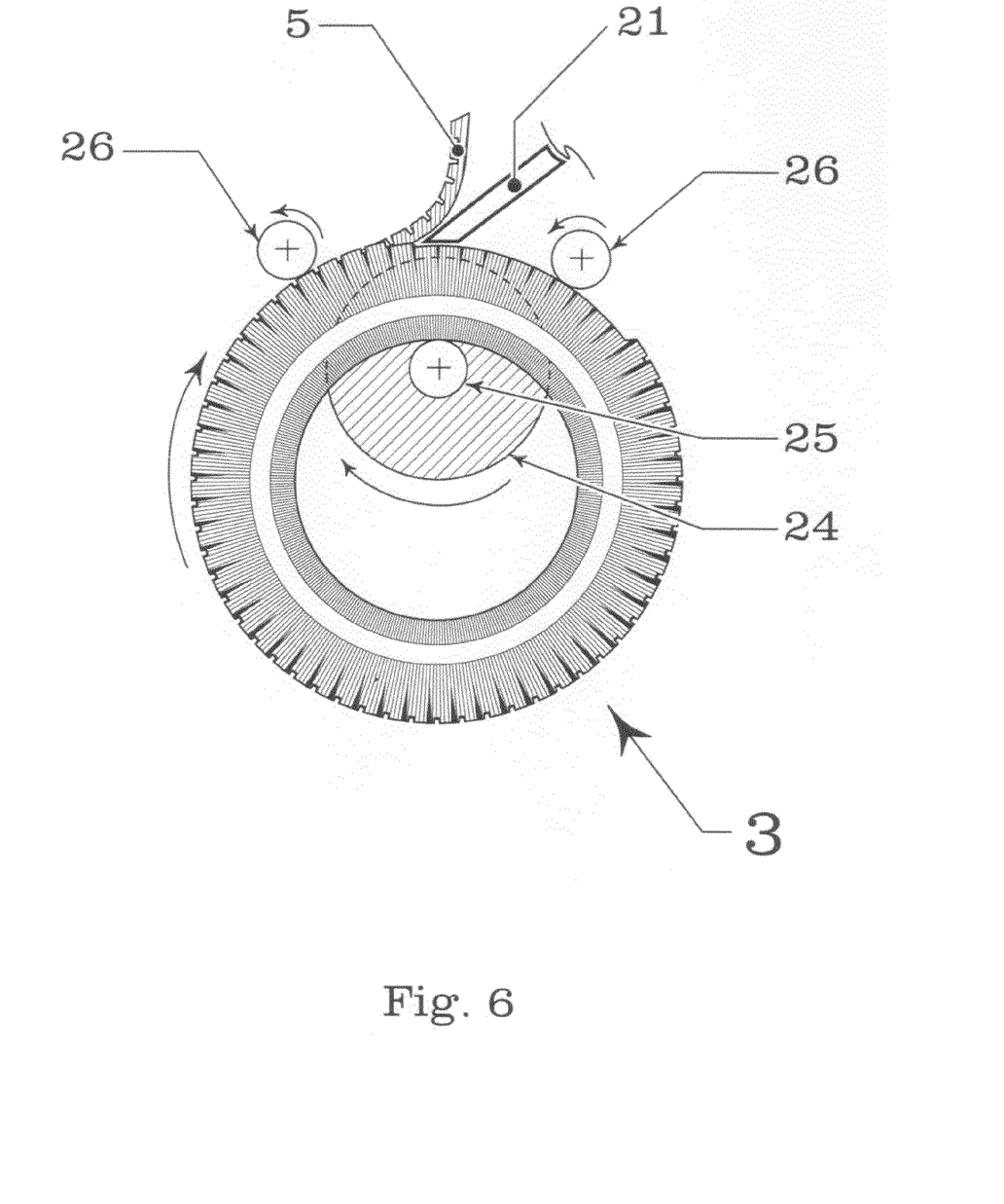
FIG. 6 is a side view showing an alternate embodiment of the present invention.

An alternative to the step of first removing the sidewalls and beads from a tire is to separate the tread portion 5 from the steel belt while the tire is still whole. As illustrated in FIG. 6, one method to accomplish this is to slip the tire 3 over a support disk 24 that has a diameter slightly smaller that the diameter of the tire rim and has a width that allows it to fit inside the tire 3. In that manner, the tire 3 can be placed over the support disk 24 so that the inner liner 11 of the tire 3 can then rest on the perimeter of the support disk 3. In that manner the support disk 3 provides the support and backing needed to allow the cutting blades 21 to apply pressure to the interface 10 from above. The support disk 24 would be connected to a drive shaft 25 so as to provide the driving power to turn the tire 3 and push the interface 10 into the cutting blades 21. Rollers 26 at the top of the tire 3 can be used to hold down and stabilize the tire 3 as well to provide additional torque to help turn the tire 3.

An alternative to the use of a support disk 24 is to place the tire 3 onto a flexible hub that comprises expanding rims or blocks. With the tire 3 in place, the blocks support the tire at the inner liner, thereby providing backing and support for the cutting blades above the steel belts. The hub provides the power to rotate the tire, thus enabling the cutting blades to separate the tire block from the steel belt in much the same manner as in the belt loop arrangement described above. An alternative to the use of expanding blocks is to inflate the tire by a method similar to that used in the tire retreating industry. With the tire properly inflated, the tread would be stiff enough to allow the cutting blades to push their way through the tread/steel interface. The hub on which the tire is mounted would provide the necessary torque to rotate the tire.

An additional step is to soak the tread loop 16 in a rubber softening solution using a chemical agent such as di-limonene, kerosene, xylene and others. The softening action makes the rubber easier to cut, thus reducing both energy requirements and equipment wear. It also reduces the energy and maintenance cost of any subsequent grinding of the separated rubber. However, recovering the rubber softening agent from the ground rubber may be necessary, depending on the type of chemical that is used, and specifically on the cost of the chemicals and the intended application of the rubber that is produced.

What is claimed is:

1. A method of recovering rubber from a manufactured tire, the tire comprising one or more steel belts and a tread portion above the steel belts, the method comprising the steps of:
    (a) supporting directly the tread portion of the tire, the support being located directly beneath the tread portion;
    (b) providing a cutting blade, the cutting blade being located directly above the supported tread portion of the tire;
    (c) positioning the cutting blade so that the cutting edge of the cutting blade extends axially across the tread portion;
    (d) guiding the cutting blade through the tread portion until the cutting blade reaches the interface between the tread portion and the steel belts; and
    (e) moving said tire relative to the cutting blade so that the cutting blade separates the tread portion of the tire from the steel belts at the interface between the tread portion and the steel belts.

2. The method of claim 1 where the cutting blade is at least as wide as the tread portion.

3. The method of claim 2 where the tread portion is removed in a single strip.

4. The method of claim 1 where the cutting blade is actuated by pneumatic means.

5. The method of claim 1 where the cutting blade is heated.

6. The method in claim 1 where the cutting blade is a chisel.

7. The method of claim 6 where the chisel has a beveled edge.

8. The method of claim 7 further comprising the step of orienting the cutting blade so that the beveled edge is parallel to the interface between the rubber and the steel belts.

9. The method of claim 1 further comprising the step of removing the sidewalls of the tire prior to positioning the cutting blade.

10. The method of claim 9 further comprising the step of cutting the tire across its width after the sidewalls have been removed to form a flat strip.

* * * * *